US011240358B2

(12) United States Patent
Gorsica et al.

(10) Patent No.: US 11,240,358 B2
(45) Date of Patent: Feb. 1, 2022

(54) ELECTRONIC DEVICES AND METHODS FOR MOVING CONTENT PRESENTATION ON ONE OR MORE DISPLAYS

(71) Applicant: Motorola Mobility LLC, Chicago, IL (US)

(72) Inventors: John Gorsica, Round Lake, IL (US); Kathryn Thomas, Chicago, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/907,527

(22) Filed: Jun. 22, 2020

(65) Prior Publication Data

US 2021/0400128 A1    Dec. 23, 2021

(51) Int. Cl.
  *H04M 1/02* (2006.01)
  *G06F 1/16* (2006.01)
  *G06F 3/01* (2006.01)
  *G06F 3/0488* (2013.01)

(52) U.S. Cl.
  CPC ........ *H04M 1/0266* (2013.01); *G06F 1/1643* (2013.01); *G06F 1/1647* (2013.01); *G06F 3/017* (2013.01); *G06F 3/04883* (2013.01)

(58) Field of Classification Search
  None
  See application file for complete search history.

(56) References Cited

U.S. PATENT DOCUMENTS

| 2009/0244832 A1* | 10/2009 | Behar | G06F 3/0481 361/679.55 |
| 2009/0303676 A1* | 12/2009 | Behar | G06F 16/9577 361/679.27 |
| 2012/0266098 A1* | 10/2012 | Webber | G06F 3/04883 715/778 |
| 2015/0264206 A1* | 9/2015 | Maeda | H04N 1/00506 358/1.13 |
| 2015/0293671 A1* | 10/2015 | Miki | G06F 3/04845 345/173 |

(Continued)

OTHER PUBLICATIONS

"Mi Mix Alpha", Unknown publication date but believed to be prior to filing of present application; viewed online Jul. 13, 2020 at mi.com.

(Continued)

*Primary Examiner* — Toan H Vu
(74) *Attorney, Agent, or Firm* — Philip H. Burrus, IV (57) ABSTRACT

An electronic device includes a first touch sensitive display positioned on a first major surface of the electronic device and a second touch sensitive display positioned on a second major surface of the electronic device, or alternatively a single display wrapping about the first major surface and the second major surface. One or more processors cause a presentation of content on the first touch sensitive display while the one or more sensors receive user input. In response to the user input, which can be received by the second touch sensitive display, the one or more processors cease the presentation of the content on the first touch sensitive display and commence another presentation of the content on the second touch sensitive display. The process is reversible to send the content back to the first touch sensitive display.

20 Claims, 6 Drawing Sheets

(56) References Cited

U.S. PATENT DOCUMENTS

| | | | |
|---|---|---|---|
| 2016/0188148 A1* | 6/2016 | Lee | G06F 3/04812 |
| | | | 715/719 |
| 2017/0115944 A1* | 4/2017 | Oh | G06F 1/1694 |
| 2017/0265238 A1* | 9/2017 | Li | H04W 88/06 |
| 2018/0129262 A1* | 5/2018 | Veiga | G06F 1/1681 |
| 2019/0012000 A1 | 1/2019 | Cavallaro et al. | |
| 2019/0042066 A1* | 2/2019 | Kim | G06F 3/0482 |
| 2019/0079662 A1* | 3/2019 | Wan | G06F 3/016 |
| 2019/0261519 A1* | 8/2019 | Park | G06F 1/1652 |
| 2019/0361694 A1* | 11/2019 | Gordon | G06F 1/1673 |

OTHER PUBLICATIONS

"NEX—Dual Display", Unknown publication date but believed to be prior to filing of present application; viewed online Jul. 13, 2020 at https://www.vivo.com/en/products/nexdualdisplay.

"Xiaomi Mi Mix Alpha", Up Close Picture provided by inventor; Unknown publication date but prior to filing of present application.

Zhu, Xiaofeng , "Methods and Systems for Feature Operational Mode Control in an Electrnoic Device", Specification and Figures; Filed May 14, 2020.

\* cited by examiner

ELECTRONIC DEVICES AND METHODS FOR MOVING CONTENT PRESENTATION ON ONE OR MORE DISPLAYS

BACKGROUND

Technical Field

This disclosure relates generally to electronic devices, and more particularly to electronic devices having front-facing and rear-facing displays.

Background Art

Portable electronic device usage has become ubiquitous. Vast majorities of the population carry a smartphone, tablet computer, or laptop computer daily to communicate with others, stay in formed, to consume entertainment, and to manage their lives.

As the technology incorporated into these portable electronic devices has become more advanced, so to has their feature set. A modern smartphone includes more computing power than a desktop computer did only a few years ago. Additionally, while early generation portable electronic devices included physical keypads, most modern portable electronic devices include touch-sensitive displays. It would be advantageous to have an improved electronic device allowing more intuitive usage of these new features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to transitioning from the presentation of content on a first display positioned on a first major surface of an electronic device to the presentation of content on a second display positioned on a second major surface of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of ceasing a presentation of content on a first touch sensitive display positioned on a first major surface of an electronic device and commencing another presentation of the content on a second touch sensitive display positioned on a second major surface of the electronic device as described herein. The non-processor circuits may include, but are not limited to, a radio receiver, a radio transmitter, signal drivers, clock circuits, power source circuits, and user input devices. As such, these functions may be interpreted as steps of a method to perform the cessation of the presentation of the content on the first touch sensitive display and the commencement of another presentation on the second touch sensitive display.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

As used herein, directional terms such as "up," "down," "vertical," "horizontal," are intended to refer to the context of the electronic device being described. For example, a graphical object representing a rotatable item may be presented on a touch sensitive display or surface, where that touch sensitive display is shown in an elevation view around defined X, Y, and Z axes. In those examples, the X-Y plane will define the horizontal, with directions out of the page being defined as the negative Y direction and directions into the page being defined as the positive Y direction. Up will be defined as the positive Z direction and down will be defined as the negative Z direction. Thus, as described below when the rotatable item visually rotates "into the display" or "into the device" or "into the touch sensitive surface, this refers to visual rotation of the rotatable item occurs about an axis lying either within the X-Z plane (when presented in an elevation view), or in the X-Y plane, but askew the Y axis (when presented in a perspective view), with portions of the rotatable item to one side of the axis appearing to move in the positive Y direction, while other portions on the other side of the axis appear to rotate in the negative Y direction, and so forth.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that the design parameters used in designing modern electronic devices, such as smartphones and tablet computers, frequently result in an increasing screen-to-device housing ratio. Said differently, embodiments of the disclosure contemplate that displays of modern electronic devices are getting larger, while the device housings supporting those displays remain relatively constant. Embodiments of the disclosure contemplate that many modern electronic devices will also have multiple displays or, alternatively, displays that wrap around a device housing to provide a continuous display around the same. Embodiments of the disclosure also contemplate that with this increased display surface area, be it from one display or multiple displays, the ability to intuitively and quickly view content being presented on display(s) will provide increased device functionality and an improved user experience.

Advantageously, embodiments of the disclosure provide electronic devices, methods, and systems for transitioning which display—or portion of a single display—is active. Embodiments of the disclosure provide for the use of device rotation, user actuation targets, and double taps on inactive displays to cause a cessation of the presentation of content on one display (or display portion) and the commencement of another presentation of content on another display (or different display portion). Using any of these techniques, alone or in combination, a user can easily interact with either display (or display portion), as well as reduce unintended touch events on unused displays. Moreover, the user can quickly, easily, and intuitively cause content to switch from one display (or display portion) to another display (or display portion).

In one or more embodiments, one or more motion sensors one or more motion sensors detect the gesture of flipping the electronic device over, with this gesture toggling the active display. For example, in one or more embodiments an electronic device has a first display positioned on a first major surface of the electronic device, and a second display positioned on a second major surface of the electronic device. One or more processors operable with the first display and the second display cause a presentation of content on the first display. One or more motion sensors, operable with the one or more processors, then detect an inversion of the electronic device along a major axis of the electronic device oriented parallel to the first display or a minor axis of the electronic device oriented parallel to the first display. The one or more processors then cause, in response to the inversion, a cessation of the presentation of the content on the first display and a commencement of another presentation of the content on the second display.

In another embodiment, a user actuation target is presented on the display not presenting content. To cause that display to present content, one simply touches the user actuation target. Illustrating by example, in one or more embodiments the electronic device includes a first touch sensitive display positioned on a first major surface of the electronic device, and a second touch sensitive display positioned on a second major surface of the electronic device. One or more processors operable with the first touch sensitive display and the second touch sensitive display cause a presentation of content on the first touch sensitive display and a presentation of a user actuation target on the second touch sensitive display. When a user actuates the user actuation target by touching it, in one or more embodiments the one or more processors detect this actuation of the user actuation target. In response, the one or more processors cease the presentation of the content on the first touch sensitive display and commence another presentation of the content on the second touch sensitive display.

In yet another embodiment, no user actuation target is required. Instead, to cause a display to present content, the user simply delivers user input to that display. For example, in one or more embodiments an electronic device includes a first touch sensitive display positioned on a first major surface of the electronic device. One or more processors cause a presentation of content on the first touch sensitive display. In one or more embodiments, the electronic device also includes a second touch sensitive display positioned on a second major surface of the electronic device that receives user input while the one or more processors are causing the presentation of the content on the first touch sensitive display. In one or more embodiments, this user input is a double tap or a specific gesture. Other examples of user input will be described below. Still others will be obvious to those of ordinary skill in the art having the benefit of this disclosure. In one or more embodiments, in response to the second touch sensitive display receiving the user input while the first touch sensitive display is presenting the content, the one or more processors cease the presentation of the content on the first touch sensitive display and commence another presentation of the content on the second touch sensitive display.

In one or more embodiments, regardless of what technique is used to "flip" the screens, the display no longer presenting content can operate in various modes. Since they are no longer presenting content, in one or more embodiments they simply become deactivated. In another embodiment, the transition to a wallpaper mode of operation where they present an image, pattern, or other static content. In one or more embodiments, the touch sensors associated with the display becomes largely suppressed such that touch events are now largely suppressed or ignored (with the exception of when a user actuation target allowing a toggling of the display is presented). Other examples of operating modes for the display at which the presentation of content has ceased will be obvious to those of ordinary skill in the art having the benefit of this disclosure.

Embodiments of the disclosure thus advantageously provide a novel and useful touch motion suitable for use in an electronic device having a touch sensitive display (or display portion) positioned on a first major surface of the electronic device and a second touch sensitive display (or display portion) positioned on a second major surface of the electronic device. The methods, systems, and devices described herein advantageously provide a more intuitive user input experience than do prior art systems.

Figure 1:
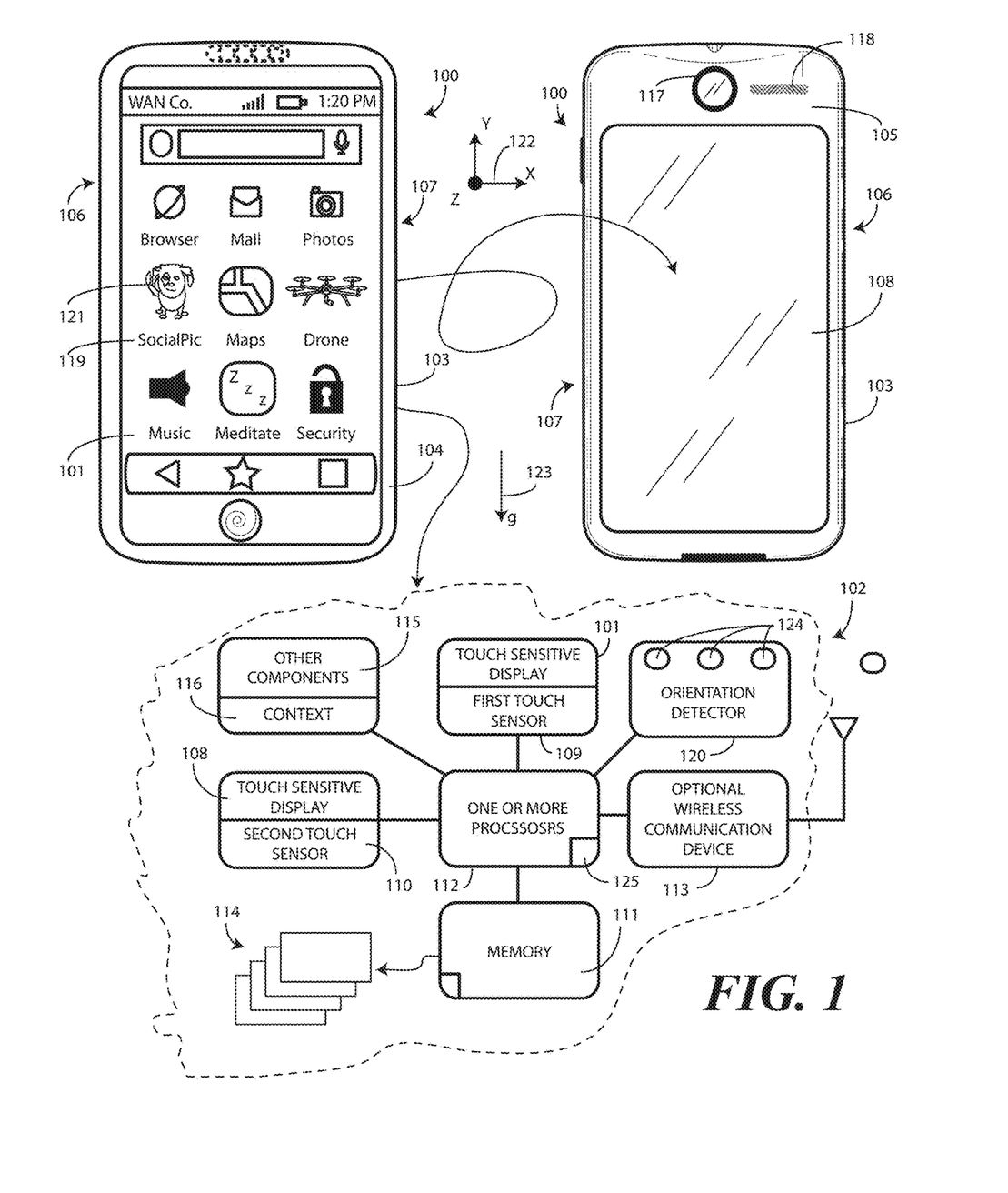
FIG. 1 illustrates one explanatory electronic device in accordance with one or more embodiments of the disclosure.

Turning now to FIG. 1, illustrated therein is one explanatory electronic device 100 configured in accordance with one or more embodiments of the disclosure. It should be noted that the electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the electronic device 100 could be other types of devices as well, including palm-top computers, tablet computers, gaming devices, media players, wearable devices, or other portable wireless communication devices. Still other devices will be obvious to those of ordinary skill in the art having the benefit of this disclosure.

Also illustrated in FIG. 1 is one explanatory block diagram schematic 102 of the explanatory electronic device 100 of FIG. 1. It should be understood that FIG. 1 is provided for illustrative purposes only and for illustrating components of one electronic device 100 in accordance with embodiments of the disclosure, and is not intended to be a complete block diagram schematic 102 of the various components that can be included with the electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the block diagram schematic 102 is configured as a printed circuit board assembly disposed within a housing 103 of the electronic device 100. Various components can be electrically coupled together by conductors or a bus disposed along one or more printed circuit boards.

The illustrative block diagram schematic 102 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the housing 103 of the electronic device 100 defines a first major surface 104 and a second major surface 105. In one or more embodiments, the first major surface 104 and the second major surface 105 are separated by one or more minor surfaces 106,107. In one or more embodiments, a user interface of the electronic device 100 includes a first display 101 positioned on the first major surface 104 of the electronic device 100. In one or more embodiments, the user interface also includes a second display 108 positioned on the second major surface 105 of the electronic device 100.

It should be noted that while an electronic device 100 having a first display 101 and a second display 108 is used in the figures for illustrative purposes, embodiments of the disclosure contemplate that modern electronic devices can include a single display that wraps about the housing 103 of the electronic device 100. For example, the single display may have a first portion that serves as the first display 101, a second portion that wraps around minor surface 106, and a third portion that serves as the second display 108. Thus, while an electronic device 100 with two displays is described as a primary embodiment below, in other embodiments the first display 101 can be replaced with a first portion of a single display, with the second display 108 being replaced by a second portion of the single display. The descriptions below could, therefore be repeated, with first portion of one display being substituted for the first display 101, and second portion of one display being substituted for the second display 108, and so forth. Those of ordinary skill in the art having the benefit of this disclosure will intuitively understand this alternate embodiment having read the description below in conjunction with this paragraph, thereby allowing the present specification to be significantly reduced in length.

In one or more embodiments, both the first display 101 and the second display 108 comprise touch sensitive displays. Where so configured, information, graphical objects, user actuation targets, and other graphical indicia can be presented either on the front of the electronic device 100, using the first display 101, which is touch sensitive, or on the back of the electronic device 100, using the second display 108, which is also touch sensitive. In one or more embodiments, so as to be touch sensitive, each of the first display 101 and the second display 108 comprise a corresponding touch sensor. As shown in FIG. 1, in one or more embodiments, the first display 101 includes a first touch sensor 109, while the second display 108 includes a second touch sensor 110.

In one or more embodiments, each of the first touch sensor 109 and the second touch sensor 110 can comprise any of a capacitive touch sensor, an infrared touch sensor, resistive touch sensors, inductive touch sensing, another touch-sensitive technology, or combinations thereof. Capacitive touch-sensitive devices include a plurality of capacitive sensors, e.g., electrodes, which are disposed along a substrate. Where so configured, each capacitive sensor can be configured, in conjunction with associated control circuitry, e.g., the one or more processors 112 operable with the first display 101 and the second display 108, to detect an object in close proximity with—or touching—the surface of the first display 101 and/or the surface of the second display 108 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Other technologies include metal mesh, silver nano wire, graphine, and carbon nanotubes. Further, it is capable of being deposited in thin layers by way of a printing process. The capacitive sensors may also be deposited on the substrate by electron beam evaporation, physical vapor deposition, or other various sputter deposition techniques.

In one or more embodiments, users can deliver user input to the first display 101 and/or the second display 108 by delivering touch input from a finger, stylus, or other objects disposed proximately with the first display 101 and/or the second display 108. In one embodiment, the first display 101 and the second display 108 are configured as an active matrix organic light emitting diode (AMOLED) display. However, it should be noted that other types of displays, including liquid crystal displays, are suitable for use with the user interface and would be obvious to those of ordinary skill in the art having the benefit of this disclosure.

Other features can be situated on either the first major surface 104 or the second major surface 105 in addition to the first display 101 and/or the second display 108. For instance, a user interface component such as a button or other control device can also be disposed on either the first major surface 104 or the second major surface 105 to facilitate additional control of the electronic device 100. Other features can be added, and can be located on the front of the housing 103, sides of the housing 103, or the rear of the housing 103. Illustrating by example, in one or more embodiments an imager 117 or a loudspeaker 118 can be positioned on either the first major surface 104 or the second major surface 105.

In one embodiment, the electronic device includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 102. Each of the application processor and the auxiliary processor(s) can be configured to process and execute executable software code to perform the various functions of the electronic device with which the block diagram schematic 102 operates. For example, in one embodiment the one or more processors 112 comprise one or more circuits operable to present content or presentation information, such as images, text, and video, on the first display 101 and the second display 108. A storage device, such as memory 111, can optionally store the executable software code used by the one or more processors 112 during operation.

As shown in FIG. 1, the one or more processors 112 are presenting content 119 on the first display 101. The content 119 of this illustration comprises one or more graphical objects. In one or more embodiments, such content 119 is retrieved, using the communication circuit 113, from one or more remote servers. The content 119 can be retrieved locally from the memory 111 as well. The content 119 can include one or more user actuation targets 121, which a user can touch to execute operations such as launching an application, opening a web page, navigating to a different screen, and so forth.

In this illustrative embodiment, the block diagram schematic 102 also includes a communication circuit 113 that can be configured for wired or wireless communication with one or more other devices or networks. The networks can include a wide area network, a local area network, and/or personal area network. The communication circuit 113 may also utilize wireless technology for communication, such as, but are not limited to, peer-to-peer or ad hoc communications such as HomeRF, Bluetooth and IEEE 802.11, and other forms of wireless communication such as infrared technology. The communication circuit 113 can include wireless communication circuitry, one of a receiver, a transmitter, or transceiver, and one or more antennas.

In one embodiment, the one or more processors 112 can be responsible for performing the primary functions of the electronic device with which the block diagram schematic 102 is operational. For example, in one embodiment the one or more processors 112 comprise one or more circuits operable with the first display 101 and the second display 108 to present presentation information to a user. The executable software code used by the one or more processors 112 can be configured as one or more modules 114 that are operable with the one or more processors 112. Such modules 114 can store instructions, control algorithms, and so forth.

Other components 115 can be included with the electronic device 100. Illustrating by example, the other components 115 can include an audio input/processor. The audio input/processor can receive audio input from an environment about the electronic device 100. The audio input/processor can include hardware, executable code, and speech monitor executable code in one embodiment.

The audio input/processor can be operable with one or more predefined authentication references stored in memory 111. The predefined authentication references can comprise representations of basic speech models, representations of trained speech models, or other representations of predefined audio sequences that are used by the audio input/processor to receive and identify voice commands that are received with audio input captured by an audio capture device. In one embodiment, the audio input/processor can include a voice recognition engine. Regardless of the specific implementation utilized in the various embodiments, the audio input/processor can access various speech models stored with the predefined authentication references to identify speech commands. The audio input/processor can also include one or more audio input devices, such as one or more microphones.

In one or more embodiments, the other components 115 can include various sensors operable with the one or more processors 112. These sensors can include a geo-locator that serves as a location detector, an orientation detector 120 that determines an orientation and/or movement of the electronic device 100 in three-dimensional space 122, an imager 117, a face analyzer, an environmental analyzer, infrared imager, depth imager, and gaze detector.

Illustrating by example, in one or more embodiments one or more motion sensors 124 can be configured as an orientation detector 120 that determines an orientation and/or movement of the electronic device 1000 in three-dimensional space 122. Illustrating by example, the orientation detector 120 can include an accelerometer, gyroscope(s), or other device to detect device orientation and/or motion of the electronic device 100. Using an accelerometer as an example, an accelerometer can be included to detect motion of the electronic device 100 in the three-dimensional space 122. Additionally, the accelerometer can be used to sense some of the gestures of the user, such as one talking with their hands, running, or walking.

In one or more embodiments, the orientation detector 120 can determine the spatial orientation of an electronic device 100 in three-dimensional space 120 by, for example, detecting a gravitational direction 123. In addition to, or instead of, an accelerometer, an electronic compass can be included to detect the spatial orientation of the electronic device 100 relative to the earth's magnetic field. Similarly, one or more gyroscopes can be included to detect rotational orientation of the electronic device 100 in the three-dimensional space 122. Other examples of orientation detectors will be obvious to those of ordinary skill in the art having the benefit of this disclosure.

The other components 115 can also include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 115 can also include proximity sensors. The proximity sensors can fall in to one of two camps: active proximity sensors that include a transmitter and receiver pair, and "passive" proximity sensors that include a receiver only. Either the proximity detector components or the proximity sensor components can be generally used for gesture control and other user interface protocols in one or more embodiments.

The other components 115 can optionally include a barometer operable to sense changes in air pressure due to elevation changes or differing pressures of the electronic device 100. The other components 115 can also optionally include a light sensor that detects changes in optical intensity, color, light, or shadow in the environment of an electronic device.

A context engine 116 can then operable with the other components 115 to detect, infer, capture, and otherwise determine persons and actions that are occurring in an environment about the electronic device 100. For example, where included one embodiment of the context engine 116 determines assessed contexts and frameworks using adjustable algorithms of context assessment employing information, data, and events. These assessments may be learned through repetitive data analysis or via machine learning and training. Alternatively, a user may employ the user interface to enter various parameters, constructs, rules, and/or paradigms that instruct or otherwise guide the context engine 116 in detecting multi-modal social cues, emotional states, moods, and other contextual information. The context engine 116 can comprise an artificial neural network or other similar technology in one or more embodiments.

Figure 2:
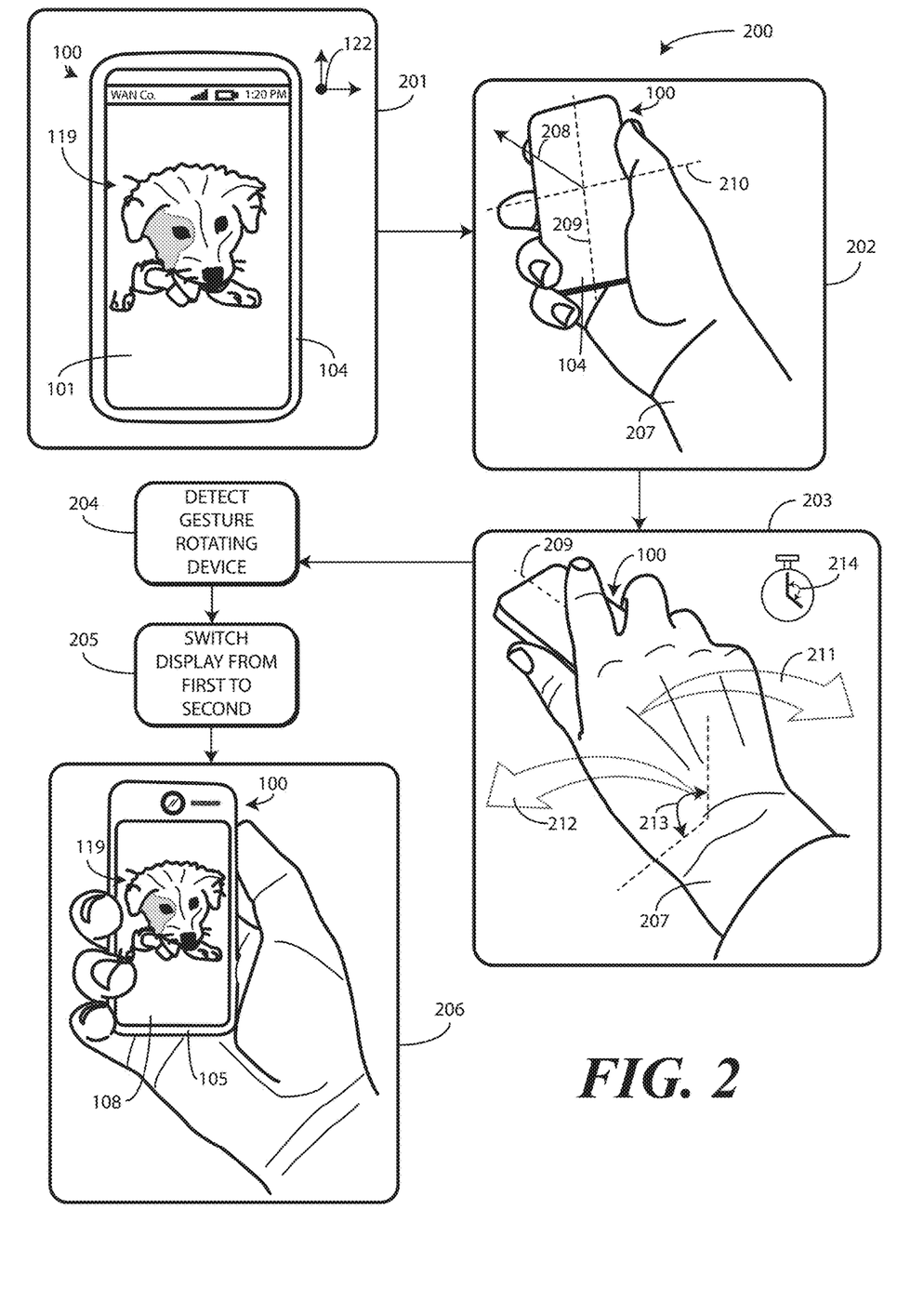
FIG. 2 illustrates one explanatory electronic device executing or more explanatory operating steps in accordance with one or more embodiments of the disclosure.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Turning first to FIG. 2, illustrated therein is one explanatory method 200 for using the electronic device 100 of FIG. 1 to quickly, easily, and simply cause cessation of the presentation of content 119 on a first display 101 and a commencement of another presentation of the content 119 on the second display 108 in accordance with embodiments of the disclosure. The method 200 of FIG. 2 illustrates one explanatory electronic device 100 executing or more explanatory operating steps in accordance with one or more embodiments of the disclosure. Other methods will be described thereafter with reference to FIGS. 3 and 4.

Beginning at step 201, an electronic device 100 configured as described above with reference to FIG. 1 is presented. As shown at step 201, a first display 101 positioned on a first major surface 104 of the electronic device is presenting content 119. Here the content 119 is a picture of the dog of an authorized user of the electronic device 100 named Buster. However, the content 119 could take any number of forms. The content can include static content, e.g., pictures, dynamic content, e.g., video, a combination of the two, user actuation targets, interactive content, or other forms of content. Still other types of content suitable for presentation on the display of an electronic device will be obvious to those of ordinary skill in the art having the benefit of this disclosure.

As previously described, the electronic device 100 includes a second display 108 (shown at step 206) that is positioned on the second major surface 105 of the electronic device 100. Additionally, one or more processors (112) are operable with the first display 101 and the second display 108. The one or more processors (112) can also be operable with one or more motion sensors (124) operating as an orientation detector (120) to detect the static or dynamic orientation of the electronic device 100 in three-dimensional space 122.

At step 202, an authorized user 207 of the electronic device 100 is holding the electronic device with the first major surface 104 oriented upward. Said differently, as shown at step 202, the authorized user 207 is holding the electronic device 100 with the minor axis 208 oriented normally with the first major surface 104, shown here as the Z-axis, oriented upward so that the authorized user 207 can see the content 119 being presented on the first display 101. A major axis 209 oriented parallel to the first display 101 is oriented such that it runs roughly parallel to the palm of the authorized user's hand, as does a minor axis 210 oriented parallel to the first display 101 positioned on the first major surface 104 of the electronic device 100.

At step 203, the authorized user 207 makes a gesture 211 causing an inversion 212 of the electronic device 100. In this example, the gesture 211 inverts the electronic device 100 along the major axis 209 oriented parallel to the first display 101 positioned on the first major surface 104 of the electronic device 100 by causing the minor axis 210 oriented parallel with the first display 101 positioned on the first major surface 104 of the electronic device 100 to rotate about the major axis 209 oriented parallel to the first display 101 positioned on the first major surface 104 of the electronic device 100. The authorized user 207 could have just as easily performed the inversion 212 by causing the major axis 209 oriented parallel with the first display 101 positioned on the first major surface 104 of the electronic device 100 to rotate about the minor axis 210 oriented parallel to the first display 101 positioned on the first major surface 104 of the electronic device 100. Either way, this causes the minor axis 208 oriented normally with the first major surface 104 to now point down and away from the face of the authorized user 207.

At step 204, one or more motion sensors (124) detect the inversion 212 occurring at step 203. In one or more embodiments, the one or more motion sensors (124) detect the inversion 212 by detecting a change in an orientation of the electronic device 100 in three-dimensional space 122 while the one or more processors (112) are causing the presentation of the content 119 on the first display 101. In one or more embodiments, the determination of the change of orientation could be augmented by stationary orientation detection following the inversion 212, which can be performed once the authorized user 207 starts looking at second display 108.

At step 205, the one or more processors (112) of the electronic device 100, in response to the one or more motion sensors (124) detecting the inversion 212 at step 204, cause a cessation of the presentation of the content 119 on the first display 101 and a commencement of another presentation of the content 119 on the second display 108. The result is shown at step 206, where the content 119 is now being presented on the second display 108.

What happens to the first display 101 when the authorized user 207 causes the presentation to "flip" from the first display 101 to the second display 108 can vary. In one or more embodiments, the first display 101 can change from a content presentation mode to another mode of operation. For example, in one embodiment, the one or more processors (112) of the electronic device 100 can simply deactivate the first display 101. In another embodiment, the one or more processors (112) of the electronic device 100 can cause the first display 101 to transition to a wallpaper mode of operation where it presents an image, pattern, or other static content. In still other embodiments, the one or more processors (112) of the electronic device 100 can suppress the sensitivity of the touch sensors associated with the first display 101. In one or more embodiments, when the second display 108 is presenting the content 119 as shown at step 206, the touch sensors of the first display 101 are largely suppressed such that touch events occurring at the first display 101 are now largely suppressed or ignored. (Note that there is an exception contemplated by embodiments of the disclosure described with reference to FIG. 3 below.) These operating modes are illustrative only, as numerous other examples of operating modes for the display at which the presentation of content has ceased will be obvious to those of ordinary skill in the art having the benefit of this disclosure.

Should the authorized user 207 wish to transition the presentation of the content 119 back to the first display 101, in one or more embodiments all they would need to do is again invert the electronic device 100 back using a gesture 211 opposite of that shown at step 203. At step 204 the one or more sensors (124) of the electronic device 100 would detect this inversion 212 along either the major axis 209 oriented parallel with the first display 101 positioned on the first major surface 104 of the electronic device 100 or the minor axis 210 oriented parallel with the first display 101 positioned on the first major surface 104 of the electronic device 100. The one or more processors (112) would then, at step 205 in response to the inversion 212, cause a cessation of the other presentation of the content 119 on the second display 108 and a commencement of the presentation of the content 119 on the first display 101. This reversal process would return the electronic device 100 to the operating mode shown at step 201.

In one or more embodiments, as shown at step 203, the inversion 212 occurring in response to the gesture 211 must exceed a predefined rotation threshold 213 for the one or more processors (112) to take action in response to the one or more motion sensors (124) detecting the same. Said differently, in one or more embodiments the one or more motion sensors only detect the inversion 212 of the electronic device 100 when the rotation of the electronic device 100 around the major axis 209 of the electronic device oriented parallel to the first display 101 or around the minor axis 210 of the electronic device oriented parallel to the first display 101 exceeds a predefined rotation threshold 213. In one or more embodiments, the predefined rotation threshold 213 is greater than one hundred degrees. Other predefined rotation thresholds 213 will be obvious to those of ordinary skill in the art having the benefit of this disclosure. In one or more embodiments, the predefined rotation threshold 213 is user-definable using a settings menu in the electronic device 100.

This preclusion of detecting the inversion 212 of the electronic device 100 when the rotation of the electronic device 100 around the major axis 209 of the electronic device oriented parallel to the first display 101 or around the minor axis 210 of the electronic device oriented parallel to the first display 101 is less than the predefined rotation threshold 213 ensures that the presentation of the content 119 does not switch from the first display 101 to the second display 108, or vice versa, when the authorized user 207 is looking at the presentation of the content 119 on the first display 101 when reclining back in an easy chair, for example, but ensures that the presentation of the content 119 does switch from the first display 101 to the second display 108, or vice versa, when the authorized user 207 completely—or nearly completely—turns the electronic device 100 over.

In one or more embodiments, as shown at step 203, the inversion 212 occurring in response to the gesture 211 must occur within a predefined duration threshold 214 for the one or more processors (112) to take action in response to the one or more motion sensors (124) detecting the same. Said differently, in one or more embodiments the one or more motion sensors only detect the inversion 212 of the electronic device 100 when the rotation of the electronic device 100 around the major axis 209 of the electronic device oriented parallel to the first display 101 or around the minor axis 210 of the electronic device oriented parallel to the first display 101 occurs within a predefined duration threshold 214. In one or more embodiments, the predefined duration threshold 214 is less than two seconds. Other predefined duration thresholds 214 will be obvious to those of ordinary skill in the art having the benefit of this disclosure. In one or more embodiments, the predefined duration threshold 214 is user-definable using a settings menu in the electronic device 100. Again, the determination of the change of orientation could be augmented by stationary orientation detection following the inversion 212, which can be performed once the authorized user 207 starts looking at second display 108.

This preclusion of detecting the inversion 212 of the electronic device 100 when the rotation of the electronic device 100 around the major axis 209 of the electronic device oriented parallel to the first display 101 or around the minor axis 210 of the electronic device oriented parallel to the first display 101 is greater than the predefined duration threshold 214 ensures that the presentation of the content 119 does not switch from the first display 101 to the second display 108, or vice versa, when the authorized user 207 is looking at the presentation of the content 119 on the first display 101 and slowly leaning back—or turning over—in bed, for example, but ensures that the presentation of the content 119 does switch from the first display 101 to the second display 108, or vice versa, when the authorized user 207 quickly performs the gesture 211 turning the electronic device 100 over.

In one or more embodiments, the one or more processors (112) are responsible for determining whether the inversion 212 of the electronic device 100 occurs within the predefined duration threshold 214. Illustrating by example, in one or more embodiments the one or more processors (112) are equipped with a timer (125). The one or more processors (112) record the orientation of the minor axis 208 oriented normally with the first major surface 104 when the gesture 211 commences, and initiate the timer (125). For the predefined duration threshold 214, which may be defined by expiration of the timer (125), the one or more processors (112) receive data signals from the one or more motion sensors (124) and compare the orientation of the minor axis 208 oriented normally with the first major surface 104 with that recorded at the start of the gesture 211. In one or more embodiments, if the inversion 212, which may have to exceed the predefined rotation threshold as well—occurs within the predefined duration threshold, the one or more processors (112) of the electronic device 100, in response to the inversion 212 occurring within the predefined duration threshold 214, and optionally beyond the predefined rotation threshold 213, cause a cessation of the presentation of the content 119 on the first display 101 and a commencement of another presentation of the content 119 on the second display 108, or vice versa.

It should be noted that any of the conditions described above can be used as conditions precedent to inversion detection or content-display swapping alone or in combination. These conditions include detecting the inversion 212 of the electronic device 100 only where the change in orientation in the three-dimensional space 122 exceeds the predefined rotation threshold 213, detecting the inversion 212 of the electronic device 100 where the change in orientation in the three-dimensional space 122 occurs within a predefined duration threshold 214, or activating the one or more motion sensors (124) only when the one or more processors (112) are causing a presentation of the content 119 on either the first display 101 or the second display 108. Thus, these three conditions provide three-factorial ways to gate the triggering of the one or more processors (112) causing, in response to the inversion 212, a cessation of the presentation of the content 119 on the first display 101 and a commencement of another presentation of the content 119 on the second display 108, or vice versa.

It should be noted that while an inversion 212 is used illustratively to trigger the one or more processors (112) causing a cessation of the presentation of the content 119 on the first display 101 and a commencement of another presentation of the content 119 on the second display 108, or vice versa, in FIG. 2, other gestures 211 could be substituted for the inversion 212 of FIG. 2. Illustrating by example, in another embodiment the gesture 211 triggering the one or more processors (112) causing a cessation of the presentation of the content 119 on the first display 101 and a commencement of another presentation of the content 119 on the second display 108, or vice versa, comprises a hand or other object approaching the electronic device 100. One or more proximity sensors, described above with reference to FIG. 1, can detect such a gesture 211. In another embodiment, the gesture 211 input comprises the authorized user 207 twisting the electronic device 100 about the major axis 209 oriented parallel to the first display 101 positioned on the first major surface 104 of the electronic device 100 or the minor axis 210 oriented parallel to the first display 101 positioned on the first major surface 104 of the electronic device 100 in three-dimensional space 122, as detected by the orientation detector (120), imager (117), or other sensors of the other components (115).

In still another embodiment, the authorized user 207 can trigger the one or more processors (112) causing a cessation of the presentation of the content 119 on the first display 101 and a commencement of another presentation of the content 119 on the second display 108, or vice versa by moving a hand or arm in predefined motions in close proximity to the electronic device 100, as detected by the one or more proximity sensors, the imager (117), or the other sensors of the other components (115). In yet another embodiment, the authorized user 207 can trigger the one or more processors (112) causing a cessation of the presentation of the content 119 on the first display 101 and a commencement of another presentation of the content 119 on the second display 108, or vice versa, by lifting, shaking, translating, or otherwise deliberately moving the electronic device 100 in three-dimensional space 122, as detected by the one or more motion sensors (124), imager (117), or other sensors of the other components (115). Other examples of device function trigger inputs will be described below. Still others will be obvious to those of ordinary skill in the art having the benefit of this disclosure.

In one or more embodiments, the authorized user 207 can trigger the one or more processors (112) causing a cessation of the presentation of the content 119 on the first display 101 and a commencement of another presentation of the content 119 on the second display 108, or vice versa, by making a gesture 211 translating the electronic device 100 back and forth in three-dimensional space 122. For example, the gesture input can translate the electronic device 01 in a chopping motion in the three-dimensional space 122. In so doing, the user can shake the electronic device 100 up and down in a "chop chop" motion.

Figure 3:
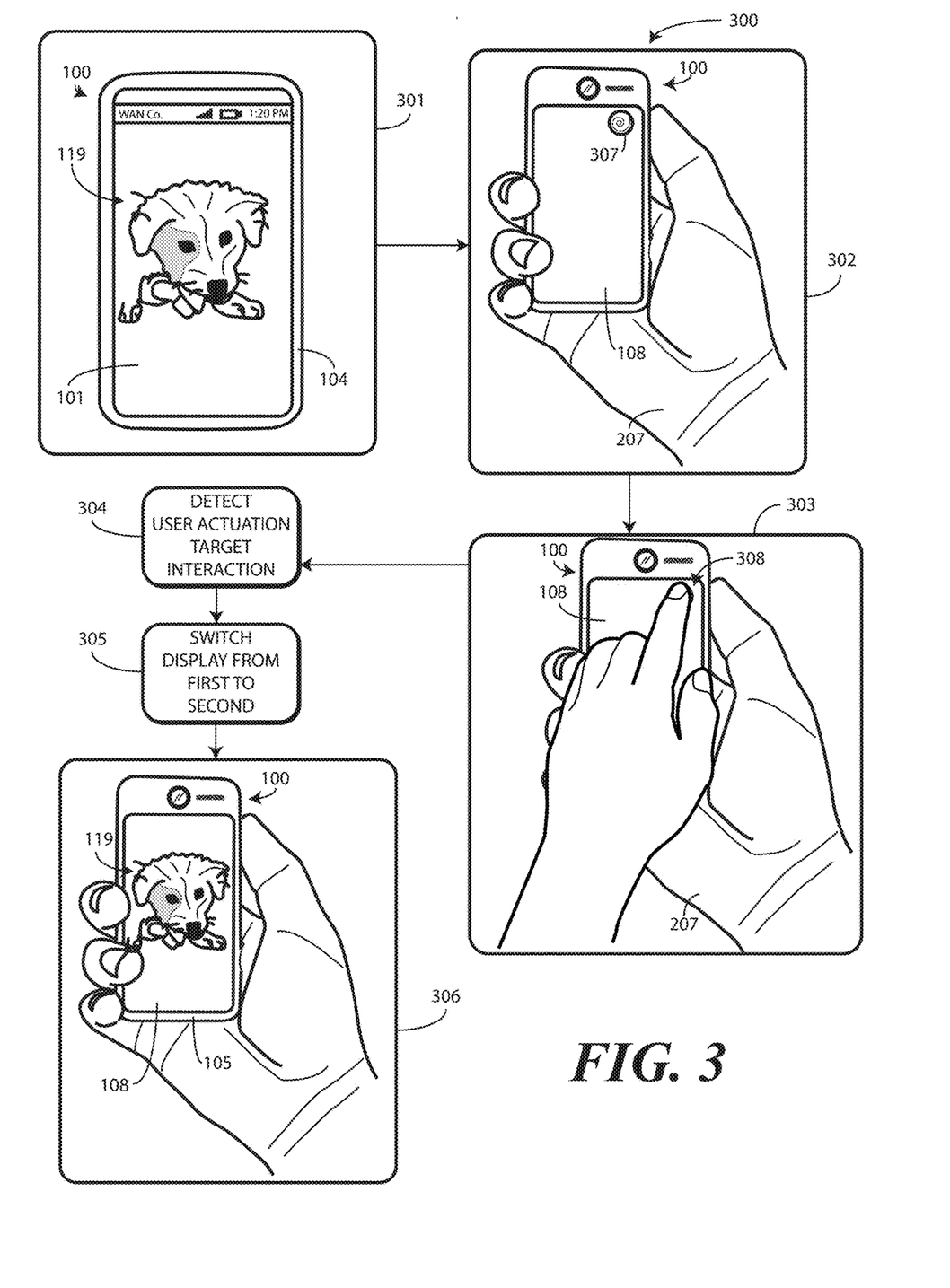
FIG. 3 illustrates one explanatory electronic device executing or more explanatory operating steps in accordance with one or more embodiments of the disclosure.

Turning now to FIG. 3, illustrated therein is another explanatory method 300 for using the electronic device 100 of FIG. 1 to quickly, easily, and simply cause cessation of the presentation of content 119 on a first display 101 and a commencement of another presentation of the content 119 on the second display 108 in accordance with embodiments of the disclosure. The method 300 of FIG. 3 illustrates one explanatory electronic device 100 executing or more explanatory operating steps in accordance with one or more embodiments of the disclosure.

Beginning at step 301, an electronic device 100 configured as described above with reference to FIG. 1 is presented. As shown at step 301, a first display 101, which is a touch sensitive display, is positioned on a first major surface 104 of the electronic device is presenting content 119. As previously described, the electronic device 100 includes a second display 108 (shown at step 306) that is also configured as a touch sensitive display and is positioned on the second major surface 105 of the electronic device 100. Additionally, one or more processors (112) are operable with the first display 101 and the second display 108.

As shown at step 302, in one or more embodiments when the one or more processors (112) of the electronic device cause the presentation of the content 119 on the first display 101, the one or more processors (112) of the electronic device 100 cause the presentation of a user actuation target 307 on the second display 108. In this illustrative embodiment, the presentation of the user actuation target 307 is the only presentation occurring on the second display 108 at step 302. However, in other embodiments the one or more processors (112) may cause the presentation of additional indicia, including wall paper, images, and so forth, when the user actuation target 307 is being presented.

In one or more embodiments, the user actuation target 307 comprises a graphical indicator presented in a display. The authorized user 207 of the electronic device 100 can touch a display atop the user actuation target 307 to cause a control operation to occur. In the method 300 of FIG. 3, the control operation causes the one or more processors (112) to switch the presentation of the content 119 from the first display 101 to the second display 108.

As shown at step 302, the authorized user 207 is holding the electronic device 100 with the first display 101 (which is presenting the content 119) toward his palm. The authorized user 207 therefore cannot see the content 119. However, this situation is easily rectified using the method 300 of FIG. 3.

At step 303, the authorized user 207 actuates the user actuation target 307 by delivering touch input 308 to the second display 108 at the user actuation target 307. In one embodiment, the touch input 308 comprises a single tap of the user actuation target 307 at a location of the second display 108 corresponding to the user actuation target 307. In another embodiment, the touch input 308 comprises a double tap at a location of the second display 108 corresponding to the user actuation target 307. Other examples of touch input actuating the user actuation target 307 will be obvious to those of ordinary skill in the art having the benefit of this disclosure.

In one or more embodiments, the one or more processors (112) detect, from the second display 108, this actuation of the user actuation target 307 at step 304. In one or more embodiments, in response to the actuation of the user actuation target 307 detected at step 304, the one or more processors (112) cease the presentation of the content 119 on the first display and commence another presentation of the content 119 on the second display 108 at step 305.

The result is shown at step 306, where the content 119 is now being presented on the second display 108. In one or more embodiments, when the one or more processors (112) of the electronic device 100 cause the content 119 to be presented on the second display 108, they cause the first display 101 to present the user actuation target 307. Said differently, in one or more embodiments step 305 includes the one or more processors (112) of the electronic device 100 further causing, in response to the actuation of the user actuation target 307, which was detected at step 304, another presentation of another user actuation target on the first display 101. In one or more embodiments, the other presentation of the other user actuation target is the only presentation occurring on the first display 101. Where this occurs, the first display 101 shown at step 301 would look exactly like the second display 108 shown at step 302, albeit a bit larger.

As before, what happens to the first display 101 when the authorized user 207 causes the presentation to "flip" from the first display 101 to the second display 108 by interacting with the user actuation target 307 can vary. In one or more embodiments, the first display 101 can change from a content presentation mode to another mode of operation. For example, in one embodiment, the one or more processors (112) of the electronic device 100 can simply deactivate the first display 101. In another embodiment, the one or more processors (112) of the electronic device 100 can cause the first display 101 to transition to a wallpaper mode of operation where it presents an image, pattern, or other static content. In still other embodiments, the one or more processors (112) of the electronic device 100 can suppress the sensitivity of the touch sensors associated with the first display 101 excluding those presenting the user actuation target 307 on the opposite display. This allows the one or more processors (112) to detect actuation of the user actuation target 307 while largely suppressing or ignoring touch input outside the user actuation target 307. These operating modes are illustrative only, as numerous other examples of operating modes for the display at which the presentation of content has ceased will be obvious to those of ordinary skill in the art having the benefit of this disclosure.

Should the authorized user 207 wish to transition the presentation of the content 119 back to the first display 101, in one or more embodiments all they would need to do is actuate the user actuation target 307 being presented on the first display 101 while the content 119 is being presented on the second display 108. At step 304 the one or more processors (112) would detect the actuation of this other user actuation target 307. The one or more processors (112) would then, at step 305 in response to the actuation of the other user actuation target 307, cause a cessation of the other presentation of the content 119 on the second display 108 and a commencement of the presentation of the content 119 on the first display 101. This reversal process would return the electronic device 100 to the operating mode shown at step 301, with the user actuation target 307 now being presented on the second display 108 as shown at step 302.

Figure 4:
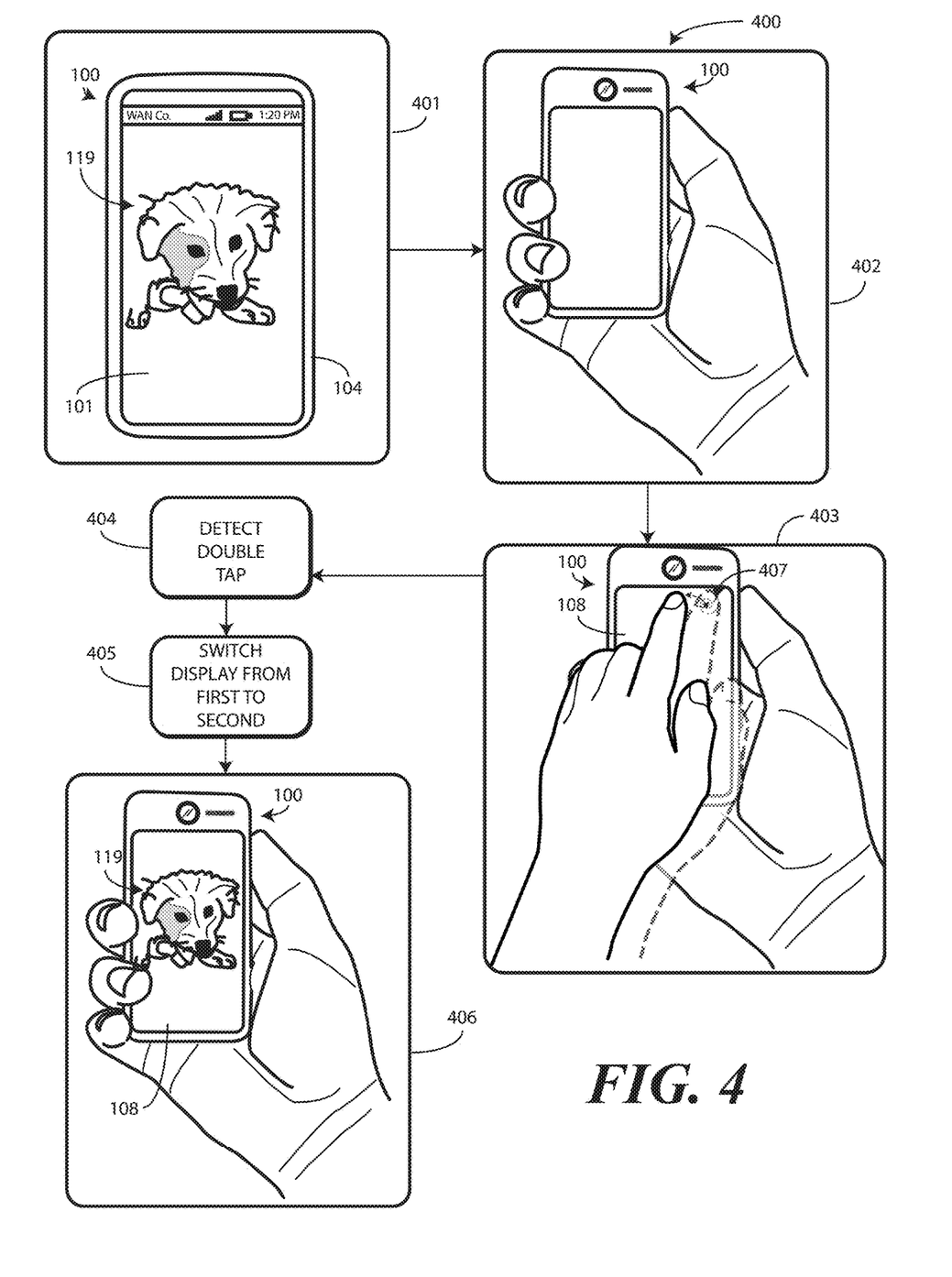
FIG. 4 illustrates one explanatory electronic device executing or more explanatory operating steps in accordance with one or more embodiments of the disclosure.

Turning now to FIG. 4, illustrated therein is yet another explanatory method 400 for using the electronic device 100 of FIG. 1 to quickly, easily, and simply cause cessation of the presentation of content 119 on a first display 101 and a commencement of another presentation of the content 119 on the second display 108 in accordance with embodiments of the disclosure. The method 400 of FIG. 4 illustrates one explanatory electronic device 100 executing or more explanatory operating steps in accordance with one or more embodiments of the disclosure.

Beginning at step 401, an electronic device 100 configured as described above with reference to FIG. 1 is presented. As shown at step 401, a first display 101, which is a touch sensitive display, is positioned on a first major surface 104 of the electronic device is presenting content 119. As previously described, the electronic device 100 includes a second display 108 (shown at steps 402,403,406) that is also configured as a touch sensitive display and is positioned on the second major surface 105 of the electronic device 100. Additionally, one or more processors (112) are operable with the first display 101 and the second display 108.

While the method 300 of FIG. 3 included the presentation of a user actuation target (307) on the second display 108 when the one or more processors (112) of the electronic device 100 were presenting content 119 on the first display 101, the method 400 of FIG. 4 offers a simplified system for causing the presentation of the content 119 to transition from the first display 101 to the second display 108, or vice versa. Specifically, as shown at step 402, in one or more embodiments when the one or more processors (112) of the electronic device 100 cause the presentation of the content 119 on the first display 101, the one or more processors (112)

deactivate the second display 108 while leaving its touch sensor (110) activated. Thus, as shown at step 402, the second display 108 is blank. However, the touch sensor (110) of the second display 108 is active and can receive user input in the form of touch or proximity input.

As is also shown at step 402, the authorized user 207 is holding the electronic device 100 with the first display 101 (which is presenting the content 119) toward his palm. The authorized user 207 therefore cannot see the content 119. However, as was the case with the method (300) of FIG. 3, this situation is easily rectified using the method 400 of FIG. 4.

At step 403, the authorized user 207 delivers user input 407 to the second display 108. Said differently, at step 403 the second display 108, positioned on the second major surface 105 of the electronic device 100, is receiving the user input 407 while the one or more processors (112) cause the presentation of the content 119 on the first display 101.

In this illustrative embodiment, the user input 407 comprises touch input upon a surface of the second display 108. In other embodiments, the user input 407 may comprise gesture input near the second display 108, gesture input moving the electronic device, or other user input. Other examples of user input 407 will be described below. Still others will be obvious to those of ordinary skill in the art having the benefit of this disclosure.

In this illustrative example, there is no user actuation target (307), so the user input 407 can be delivered anywhere along the surface of the second display 108. However, it should be noted that the method 400 of FIG. 4 could include the presentation of a user actuation target at step 402 and step 403, as was the case with the method (300) of FIG. 3. Accordingly, in another embodiment step 403 can comprise the authorized user 207 delivering the user input 407 to a user actuation target (307) as well.

In one embodiment, the user input 407 comprises a single tap upon the second display 108. Were a user actuation target (307) being presented, the user input 407 could comprise a single tap upon the user actuation target (307) at a location of the second display 108 corresponding to the user actuation target (307). In the illustrative embodiment of FIG. 4, the user input 407 comprises a double tap upon the surface of the second display 108. Had a user actuation target (307) been presented, the user input 407 occurring at step 403 could comprise a double tap tap at a location of the second display 108 corresponding to the user actuation target 307. Other examples of touch input upon the second display 108 will be obvious to those of ordinary skill in the art having the benefit of this disclosure.

In one or more embodiments, the one or more processors (112) detect, from the second display 108, the user input 407 at step 404. In one or more embodiments, in response to the second display 108 receiving the user input 407 as detected at step 304, the one or more processors (112) cease the presentation of the content 119 on the first display and commence another presentation of the content 119 on the second display 108 at step 405.

The result is shown at step 406, where the content 119 is now being presented on the second display 108. In one or more embodiments, when the one or more processors (112) of the electronic device 100 cause the content 119 to be presented on the second display 108, they deactivate the first display 101, thereby causing it to no longer present content. However, the one or more processors (112) of the electronic device 100 keep the touch sensor (109) of the first display 101 active. Said differently, in one or more embodiments step 305 includes the one or more processors (112) of the electronic device 100 ceasing the presentation of the content 119 on the first display 101 by deactivating the first display 101, but while keeping the touch sensor (109) of the first display 101 operational. Where this occurs, the first display 101 shown at step 401 would look exactly like the second display 108 shown at step 402, albeit a bit larger.

In other embodiments, the first display 101 can change from a content presentation mode to another mode of operation at step 405. For example, in one embodiment, the one or more processors (112) of the electronic device 100 can cause the first display 101 to transition to a wallpaper mode of operation where it presents an image, pattern, or other static content.

Should the authorized user 207 wish to transition the presentation of the content 119 back to the first display 101, in one or more embodiments all they would need to do is deliver the user input 407, be it a single tap, double tap, or other user input, to the first display 101 while the content 119 is being presented on the second display 108. At step 404 the one or more processors (112) would detect the user input 407 received by the first display 101. The one or more processors (112) would then, at step 405 in response to the actuation of the new user input 407, cause a cessation of the other presentation of the content 119 on the second display 108 and a commencement of the presentation of the content 119 on the first display 101. This reversal process would return the electronic device 100 to the operating mode shown at step 401, with the second display 108 deactivated and presenting no content, but with the touch sensor (110) of the second display 108 remaining active to receive additional user input.

Thus, as illustrated and described above with reference to FIGS. 2-4, embodiments of the disclosure provide an electronic device 100 having a first display 101 positioned on a first major surface 104 of an electronic device 100 and a second display 108 positioned on the second major surface 105 of the electronic device 100. Embodiments of the disclosure contemplate that these "two displays" could be replaced with a single display that wraps about the device housing (103). Where a single display is used, embodiments of the disclosure would provide for an electronic device having a first portion of the single display positioned along the first major surface 104 of the electronic device 100, and a second portion of the single display positioned along the second major surface 105 of the electronic device 100.

In one or more embodiments, when user input is received, one or more processors (112) of the electronic device 100 cause a presentation of content 119 on the first display 101 (or first portion of the single display) to cease, and cause another presentation of the content 119 on the second display 108 (or second portion of the single display) to commence. In FIG. 2, the user input was an inversion of the electronic device 100. In FIG. 3, the user input was actuation of a user actuation target 307. In FIG. 4, the user input 407 was touch input being delivered to the second display 108. Embodiments of the disclosure contemplate that these processes are reversible, with user input being delivered to the first display 101 while the second display 108 is presenting content 119, for example, causing the one or more processors (112) of the electronic device 100 to cease presenting the content 119 on the second display 108 and commence another presentation of the content 119 on the first display 101.

Figure 5:
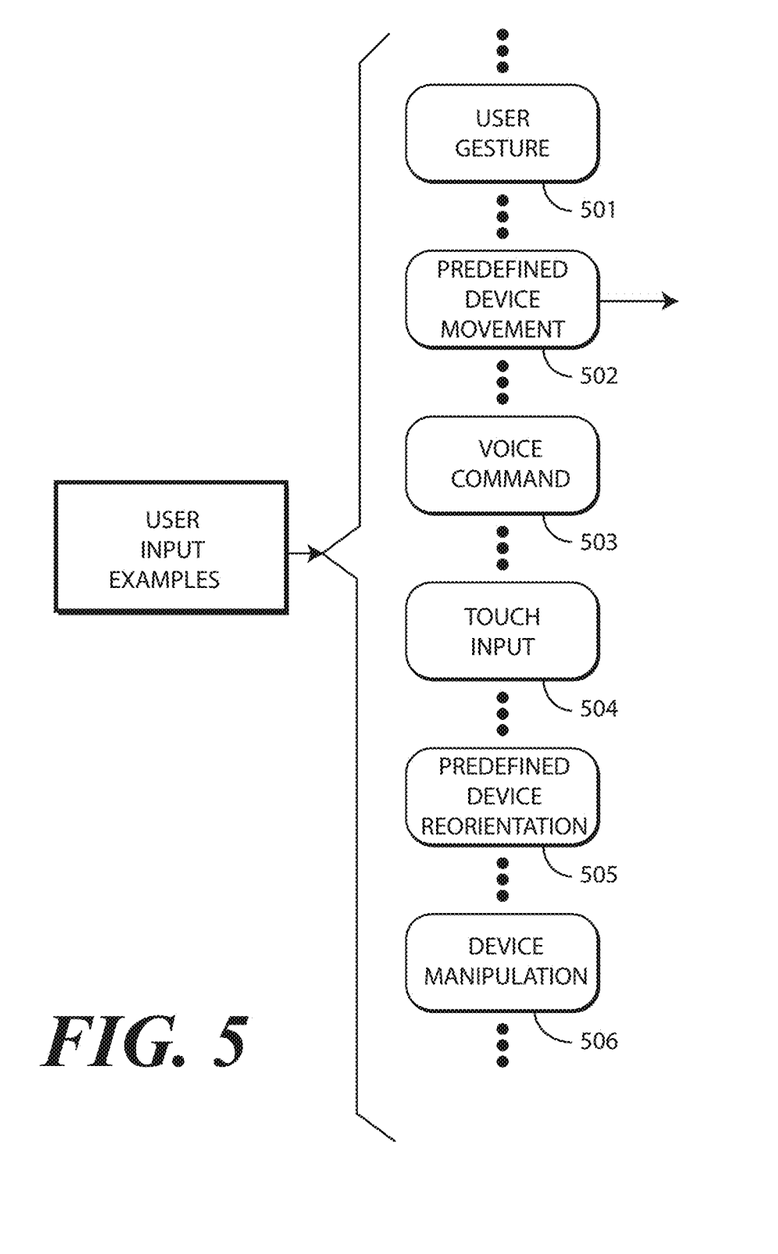
FIG. 5 illustrates examples of user input triggering one or more processors to transition the presentation of content in accordance with one or more embodiments of the disclosure.

While these three types of user input, i.e., inversion of the electronic device 100 in three-dimensional space 122, actuation of a user actuation target 307, and delivering user input 407 in the form of touch input, work well in practice, embodiments of the disclosure contemplate that the user input could take other forms as well. Turning now to FIG. 5, illustrated therein are a few examples. It should be understood that these examples of user input can take the place of the user input 407 occurring in FIG. 4 and still have the same effect of causing the one or more processors (112) of the electronic device 100 to cease the presentation of content 119 on one display (or display portion) and commence the presentation of the content 119 on the other display (or display portion).

A first example of an alternate user input 501 that can cause one or more processors (112) of the electronic device 100 to cease the presentation of content 119 on one display (or display portion) and commence the presentation of the content 119 on the other display (or display portion) is a user gesture. The user gesture could be a gesture made about the electronic device (100), such as waving a hand above the electronic device (100) as detected by the one or more proximity sensors, the imager (117), or other sensors in one or more embodiments. The gesture could comprise moving a hand or other object toward, or away from, the electronic device (100) as detected by the one or more proximity sensors, the imager (117), or other sensors in one or more embodiments. Other forms of user gestures will be obvious to those of ordinary skill in the art having the benefit of this disclosure.

In other embodiments, an alternate user input 502 can comprise a predefined movement of the electronic device (100) in three-dimensional space (122). In one or more embodiments, one alternate user input 502 translates the electronic device (100) in three-dimensional space (122) in accordance with a predefined movement.

For instance, the predefined movement can translate or otherwise move the electronic device (100) in a predefined motion in three-dimensional space (122). Illustrating by example, in one or more embodiments an authorized user (207) can translate the electronic device (100) back and forth in three-dimensional space (122), such as making a chopping motion in three-dimensional space (122). Other predefined movements translating or moving the electronic device (100) in three-dimensional space (122) will be obvious to those of ordinary skill in the art having the benefit of this disclosure.

Another example of an alternate user input 503 comprises a voice command. The authorized user (207) may deliver a voice command such as "switch displays" to cause the one or more processors (112) of the electronic device 100 to cease the presentation of content 119 on one display (or display portion) and commence the presentation of the content 119 on the other display (or display portion). Other examples of voice commands will be obvious to those of ordinary skill in the art having the benefit of this disclosure.

Still another example of an alternate user input 504 comprises different types of touch input. Single taps and double taps were described above with reference to FIGS. 3 and 4, but other forms of touch input can be used to cause the one or more processors (112) of the electronic device 100 to cease the presentation of content 119 on one display (or display portion) and commence the presentation of the content 119 on the other display (or display portion). For example, an authorized user (207) may deliver touch input in the form of a slide, twist, or grasp to cause the one or more processors (112) of the electronic device 100 to cease the presentation of content 119 on one display (or display portion) and commence the presentation of the content 119 on the other display (or display portion). Other examples of touch input will be obvious to those of ordinary skill in the art having the benefit of this disclosure.

Yet another example of an alternate user input 505 comprises a predefined rotation of the electronic device (100). The predefined rotation can comprise a predefined twist, pivot, or other rotation of the electronic device (100) that are different from that described above with reference to FIG. 2.

Still another example of an alternate user input 506 comprises a device manipulation. If, for example, device housing (103) of the electronic device (100) and the displays are deformable, device manipulation, such as bending or deforming the device housing (103) can cause one or more processors (112) of the electronic device 100 to cease the presentation of content 119 on one display (or display portion) and commence the presentation of the content 119 on the other display (or display portion). These examples shown in FIG. 5 are illustrative only, as numerous others will be obvious to those of ordinary skill in the art having the benefit of this disclosure.

Figure 6:
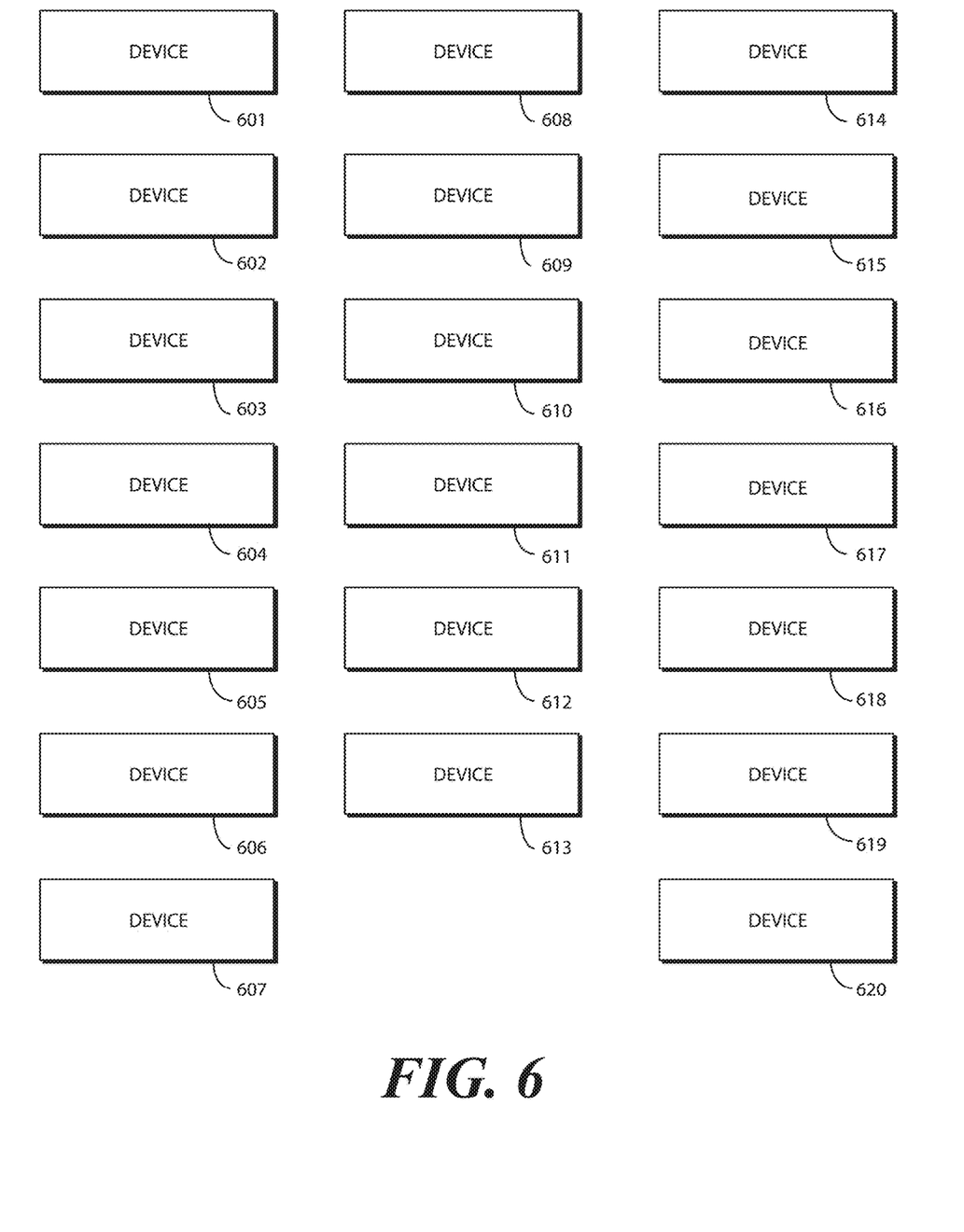
FIG. 6 illustrates various embodiments of the disclosure.

Turning now to FIG. 6, illustrated therein are various embodiments of the disclosure. The embodiments of FIG. 6 are shown as labeled boxes in FIG. 6 due to the fact that the individual components of these embodiments have been illustrated in detail in FIGS. 1-5, which precede FIG. 6. Accordingly, since these items have previously been illustrated and described, their repeated illustration is no longer essential for a proper understanding of these embodiments. Thus, the embodiments are shown as labeled boxes.

At 601, an electronic device comprises a first display positioned on a first major surface of the electronic device. At 601, the electronic device comprises a second display positioned on a second major surface of the electronic device.

At 601, the electronic device comprises one or more processors operable with the first display and the second display. At 601, the one or more processors cause a presentation of content on the first display.

At 601, the electronic device comprises one or more motion sensors operable with the one or more processors. At 601, the one or more motion sensors detect an inversion of the electronic device along a major axis of the electronic device oriented parallel to the first display or a minor axis of the electronic device oriented parallel to the first display. At 601, the one or more processors cause, in response to the inversion, a cessation of the presentation of the content on the first display and a commencement of another presentation of the content on the second display.

At 602, the one or more motion sensors of 601 detect the inversion of the electronic device when rotation of the electronic device around the major axis of the electronic device oriented parallel to the first display or around the minor axis of the electronic device oriented parallel to the first display exceeds a predefined rotation threshold. At 603, the predefined rotation threshold of 602 is greater than one hundred degrees.

At 604, the one or more motion sensors of 601 detect the inversion of the electronic device only when rotation of the electronic device around the major axis of the electronic device oriented parallel to the first display or around the minor axis of the electronic device oriented parallel to the first display occurs within a predefined duration threshold. At 605, the predefined duration threshold of 604 is less than two seconds.

At 606, the one or more motion sensors of 601 detect a change in an orientation in three-dimensional space while the one or more processors are causing the presentation of the content on the first display. At 606, the one or more motion sensors detect the inversion of the electronic device where the change in orientation exceeds a predefined threshold.

At 607, the one or more motion sensors detect the inversion of the electronic device only when the electronic device rotates around the minor axis of the electronic device oriented parallel to the first display. At 608, the one or more motion sensors comprise a gyroscope.

At 609, an electronic device comprises a first touch sensitive display positioned on a first major surface of the electronic device. At 609, the electronic device comprises a second touch sensitive display positioned on a second major surface of the electronic device.

At 609, the electronic device comprises one or more processors operable with the first touch sensitive display and the second touch sensitive display. At 609, the one or more processors cause a presentation of content on the first touch sensitive display and a presentation of a user actuation target on the second touch sensitive display.

At 610, the presentation of the user actuation target of 609 is the only presentation occurring on the second touch sensitive display. At 611, the one or more processors of 609 detect, from the second touch sensitive display, actuation of the user actuation target. At 611, in response to the actuation of the user actuation target, the one or more processors cease the presentation of the content on the first touch sensitive display and commence another presentation of the content on the second touch sensitive display.

At 612, the actuation of the user actuation target on the second touch sensitive display comprises a double tap at a location of the second touch sensitive display corresponding to the user actuation target. At 613, the one or more processors of 611 further cause, in response to the actuation of the user actuation target, another presentation of another user actuation target on the first touch sensitive display. At 614, the other presentation of 613 is the only presentation occurring on the first touch sensitive display.

At 615, an electronic device comprises a first touch sensitive display positioned on a first major surface of the electronic device. At 615, the electronic device comprises one or more processors causing a presentation of content on the first touch sensitive display.

At 615, the electronic device comprises a second touch sensitive display positioned on a second major surface of the electronic device. At 615, the electronic device receives user input while the one or more processors are causing the presentation of the content on the first touch sensitive display. In one or more embodiments, the second touch sensitive display receives the user input at 615. In other embodiments, the second touch sensitive display or other sensors receive the user input from FIG. 5.

At 615, the one or more processors, in response to the second touch sensitive display receiving the user input, cease the presentation of the content on the first touch sensitive display and commence another presentation of the content on the second touch sensitive display. At 616, the user input of 615 comprises touch input upon a surface of the first touch sensitive display.

At 617, the touch input of 616 comprises a single tap upon the second touch sensitive display. At 618, the touch input of 616 comprises a double tap upon the second touch sensitive display.

At 619, the one or more processors of 615 cease the presentation of the content on the first touch sensitive display by deactivating the first touch sensitive display. At 620, the electronic device of 615 comprises a smartphone.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first display positioned on a first major surface of the electronic device;
   a second display positioned on a second major surface of the electronic device;
   one or more processors operable with the first display and the second display, the one or more processors causing a presentation of content on the first display; and
   one or more motion sensors operable with the one or more processors, the one or more motion sensors detecting an inversion of the electronic device along a major axis of the electronic device oriented parallel to the first display or a minor axis of the electronic device oriented parallel to the first display;
   the one or more processors causing, in response to the inversion, a cessation of the presentation of the content on the first display and a commencement of another presentation of the content on the second display; and
   the one or more motion sensors detecting the inversion of the electronic device when rotation of the electronic device around the major axis of the electronic device oriented parallel to the first display or around the minor axis of the electronic device oriented parallel to the first display exceeds a predefined rotation threshold.

2. The electronic device of claim 1, the predefined rotation threshold greater than one hundred degrees.

3. The electronic device of claim 1, the one or more motion sensors detecting the inversion of the electronic device only when rotation of the electronic device around the major axis of the electronic device oriented parallel to the first display or around the minor axis of the electronic device oriented parallel to the first display occurs within a predefined duration threshold.

4. The electronic device of claim 3, the predefined duration threshold less than two seconds.

5. The electronic device of claim 1, the one or more motion sensors comprising a gyroscope.

6. The electronic device of claim 1, wherein the electronic device comprises a smartphone.

7. The electronic device of claim 1, the content comprising static content.

8. The electronic device of claim 1, the content comprising dynamic content.

9. An electronic device, comprising:
   a first display positioned on a first major surface of the electronic device;

a second display positioned on a second major surface of the electronic device;

one or more processors operable with the first display and the second display, the one or more processors causing a presentation of content on the first display; and one or more motion sensors operable with the one or more processors, the one or more motion sensors detecting an inversion of the electronic device along a major axis of the electronic device oriented parallel to the first display or a minor axis of the electronic device oriented parallel to the first display;

the one or more processors causing, in response to the inversion, a cessation of the presentation of the content on the first display and a commencement of another presentation of the content on the second display; and the one or more motion sensors detecting a change in an orientation in three-dimensional space while the one or more processors are causing the presentation of the content on the first display and detecting the inversion of the electronic device where the change in orientation exceeds a predefined threshold.

10. The electronic device of claim 9, the one or more motion sensors detecting the inversion of the electronic device only when rotation of the electronic device around the major axis of the electronic device oriented parallel to the first display or around the minor axis of the electronic device oriented parallel to the first display occurs within a predefined duration threshold.

11. The electronic device of claim 10, the predefined duration threshold less than two seconds.

12. The electronic device of claim 9, the one or more motion sensors comprising a gyroscope.

13. The electronic device of claim 9, wherein the electronic device is a smartphone.

14. The electronic device of claim 9, the predefined threshold being one hundred degrees.

15. The electronic device of claim 9, the content comprising at least one user actuation target.

16. An electronic device, comprising:

a first display positioned on a first major surface of the electronic device;

a second display positioned on a second major surface of the electronic device;

one or more processors operable with the first display and the second display, the one or more processors causing a presentation of content on the first display; and one or more motion sensors operable with the one or more processors, the one or more motion sensors detecting an inversion of the electronic device along a major axis of the electronic device oriented parallel to the first display or a minor axis of the electronic device oriented parallel to the first display;

the one or more processors causing, in response to the inversion, a cessation of the presentation of the content on the first display and a commencement of another presentation of the content on the second display; and the one or more motion sensors detecting the inversion of the electronic device only when the electronic device rotates around the minor axis of the electronic device oriented parallel with the first display.

17. The electronic device of claim 16, the one or more motion sensors comprising a gyroscope.

18. The electronic device of claim 16, the one or more motion sensors detecting the inversion while the one or more processors are presenting the content.

19. The electronic device of claim 16, the one or more processors deactivating the first display while the content is being presented on the second display in response to the one or more motion sensors detecting the inversion.

20. The electronic device of claim 16, the one or more processors suppressing sensitivity of touch sensors of the first display while the content is being presented on the second display in response to the one or more motion sensors detecting the inversion.

* * * * *